US009019276B2

(12) United States Patent
De Pauw et al.

(10) Patent No.: US 9,019,276 B2
(45) Date of Patent: *Apr. 28, 2015

(54) VISUALIZING JOBS IN A DISTRIBUTED ENVIRONMENT WITH LIMITED RESOURCES

(75) Inventors: Wim De Pauw, Tarrytown, NY (US); Peter K. Malkin, Hawthorne, NY (US)

(73) Assignee: International Business Machines Corporation, Armonk, NY (US)

(*) Notice: Subject to any disclaimer, the term of this patent is extended or adjusted under 35 U.S.C. 154(b) by 346 days.

This patent is subject to a terminal disclaimer.

(21) Appl. No.: 13/561,181

(22) Filed: Jul. 30, 2012

(65) Prior Publication Data

US 2014/0028680 A1 Jan. 30, 2014

(51) Int. Cl.
*G06T 11/20* (2006.01)

(52) U.S. Cl.
CPC .................... *G06T 11/206* (2013.01)

(58) Field of Classification Search
USPC .......................................................... 345/440
See application file for complete search history.

(56) References Cited

U.S. PATENT DOCUMENTS

| 6,298,349 | B1 | 10/2001 | Toyoshima et al. |
|---|---|---|---|
| 6,466,211 | B1 | 10/2002 | Havre et al. |
| 6,801,199 | B1 | 10/2004 | Wallman |
| 7,385,605 | B2 | 6/2008 | Twait |
| 7,663,626 | B2 | 2/2010 | Rexroad et al. |
| 7,812,843 | B2 | 10/2010 | Alcorn |
| 7,831,971 | B2 | 11/2010 | Berstis et al. |
| 7,984,142 | B2 | 7/2011 | Childress et al. |
| 8,294,716 | B2 | 10/2012 | Lord et al. |
| 2003/0200347 | A1 | 10/2003 | Weitzman |
| 2004/0085318 | A1 | 5/2004 | Hassler et al. |
| 2005/0122325 | A1 | 6/2005 | Twait |
| 2009/0231341 | A1 | 9/2009 | Lord et al. |
| 2013/0207980 | A1 | 8/2013 | Ankisettipalli et al. |

OTHER PUBLICATIONS

Office Action dated Dec. 26, 2013 received in a related U.S. Patent Application, namely U.S. Appl. No. 13/570,841.
Havre et al., "ThemeRiver: Visualizing Theme Changes over Time," Proceedings of the IEEE Symposium on Information Visualization 2000.
Ogawa et al., "Software Evolution Storylines," SOFTVIS'10, Oct. 17-21, 2010, Salt Lake City, Utah, USA.
Tufte, "Posters and Graph Paper: Napoeon's March," http://www.edwardtufte.com/tufte/posters (1861 by Minard, 1983 by Tufte), and http://it.coe.uga.edu/studio/seminars/visualization/minard.html.

(Continued)

*Primary Examiner* — Ryan R Yang
(74) *Attorney, Agent, or Firm* — Scully, Scott, Murphy & Presser, P.C.; Nidhi Garg, Esq.

(57) ABSTRACT

Visualization used to show resource usage over time by different entities or jobs allows a user to see the resource usage of entities over time. Entities or jobs may be shown as horizontal bundles, possibly expanding or contracting within the constraints of the capacity of the system. Bundles can expand or contract but maintain continuity in a direction, for example, a horizontal continuity. The visualization or layout in one embodiment is updated not only for new incoming events, but also retroactively for past events, thus achieving smooth horizontal bundles as much as possible.

24 Claims, 10 Drawing Sheets

510

(56) References Cited

OTHER PUBLICATIONS

Dalton et al., "Visualizing the Runtime Behavior of Embedded Network Systems: A Toolkit for TinyOS" Preprint submitted to Science of Computer Programming, Elsevier, Feb. 6, 2009.

Funk et al., "Building Executable Architectures of Net Enabled Operations Using State Machines to Simulate Concurrent Activities," 11th International Command and Control Research and Technology Symposium, Sep. 26, 2006-Sep. 28, 2006.

Minard's 1861 Map of Napolean's Army's Russian Campaign, http://it.coe.uga.edu/studio/seminars/visualization/minard.html, retreived May 7, 2012.

VISUALIZING JOBS IN A DISTRIBUTED ENVIRONMENT WITH LIMITED RESOURCES

FIELD

The present application relates generally to computers, and computer applications, and more particularly to a visualization tool used to show resource usage over time by different jobs.

BACKGROUND

Large computer clusters run large amounts of jobs, for instance, scheduled by an orchestrator. For example, a Mapreduce configuration or a DUCC (Distributed UIMA Computing Cluster) cluster may run hundreds of jobs. Each of these jobs may be created, may get more computing resources (e.g., number of processes or machines), may get fewer computing resources, and may terminate. Tools for monitoring the scheduling and the behavior of those jobs typically show an instantaneous view the amount of resources each job consumes at a given point in time. This is useful for administrators to see the overall occupancy of the cluster, and for the user, to see how many resources (e.g., machines) are given to their job(s). However, these traditional tools usually show snapshots of the current load balancing of jobs across the cluster. The creation, termination, expansion and contraction of jobs can be very dynamic and transient, making it difficult to observe and understand this kind of behavior without showing the evolution over time.

An example of a traditional visualization includes "stacked graphs" that could be used to illustrate the contribution over time of each job. However, this visualization type suffers from the effect that the position of the entity shown at the top layer varies wildly, making it hard to assess the contribution by this top entity.

While the stacked graphs are arranged by "gravity" (all layers are stacked on top of each other, as much as possible downwards), another type of visualization referred to as ThemeRivers, lets the different layers gravitate towards a center horizontal axis. ThemeRivers is described in http colon-slash-slash (://) www dot (.) ifs dot (.) tuwien dot (.) ac dot (.) at slash (/) ~silvia slash (/) wien slash (/) vu-infovis slash (/) references slash (/) havre-ieeeinfovis00 dot (.) pdf. This visualization suffers from the same problem, in that the outer layers suffer from a possibly wild variation in positions, as they are determined by the heights of the layers near the center. Inspecting the evolution of an individual layer can be tedious, especially near the outer layers.

In yet another mechanism, Michael Ogawa in http colon slash slash (://) vis dot (.) cs dot (.) ucdavis dot (.) edu slash (/) papers slash (/) softvis_storylines dot (.) pdf, draws participants of a software project over time as lines. However, these lines are only added to existing lines, similar to RiverThemes, making it hard to follow particular lines.

BRIEF SUMMARY

A method to show resource usage over time by different jobs, in one aspect, may comprise illustrating each of the different jobs on a computer display area comprising a first coordinate and a second coordinate. The first coordinate may represent units of time. Said each job may be drawn as a bundle starting at a first given time along in said first coordinate of the display area and ending at a second given time. A height of the bundle along the second coordinate at a given point in time between start time and end time of the bundle may indicate a number of resources said each job is using. The illustrating may further comprise displaying the bundle along the first coordinate adjacent to a previously displayed bundle of the same job in previous start and end time period wherein continuity of the bundle and representation of the resources in the bundle are maintained over multiple time periods. The illustrating may further comprise displaying the bundle along the second coordinate adjacent to usage representation for the same job but separated along the second coordinate from usage representation of another job.

A method to show resource usage over time by different jobs, in another aspect may comprise illustrating each of the different jobs on a computer display area comprising a horizontal coordinate representing units of time and a vertical coordinate, said each job drawn as a bundle starting at a first given time along in said horizontal coordinate of the display area and ending at a second given time, a height of the bundle along the vertical coordinate at a given point in time between start time and end time of the bundle indicating a number of resources said each job is using. The illustrating may further comprise displaying the bundle possibly with varying vertical positions, corresponding to different times between start and end times, wherein continuity of the bundle and representation of the resources in the bundle are maintained over multiple time periods, and displaying the bundle vertically adjacent to usage representation for the same job but separated vertically from usage representation of another job.

A method of visualizing resource usage over time, in yet another aspect, may comprise obtaining a status of resource usage for a current time period. The method may also comprise, for a new job starting during the current time period as identified in the obtained status, positioning a job bundle to start at a first coordinate of a display to indicate a time of the start of the new job. The method may further comprise determining based on the obtained status whether a user of the new job has one more other jobs running in the current time period. The method may also comprise, in response to determining that the user has one or more other jobs running in the current time period, positioning the job bundle to start at a second coordinate of the display that is adjacent to the one or more other jobs and where there is most space available. The method may also comprise, in response to determining that the user does not have one or more other jobs running in the current time period, positioning the job bundle to start at the second coordinate that is not between two jobs belonging to another user and where there is most space available. The method may further comprise adjusting a position of the job bundle along the second coordinate taking into account one or more neighbors along the second coordinate and, as much as possible, a continuity of the job bundle along the first coordinate. The method may also comprise repeating the above steps in a next time period with the next time period as the current time period.

A system for showing resource usage over time by different jobs, in one aspect, may comprise a processor, a display device coupled to the processor, and a graphical module operable to execute on the processor and further operable to illustrate each of the different jobs on a display area of the display device. The display area may comprise a first coordinate representing units of time and a second coordinate. Each job may be drawn as a bundle starting at a first given time along in said first coordinate of the display area and ending at a second given time. A height of the bundle along the second coordinate at a given point in time between start time and end time of the bundle may indicate a number of resources said each job is using. The graphical module may be further operable to illustrate by displaying the bundle along the first coordinate possibly with varying vertical positions, corresponding to different times between start and end time period wherein continuity of the bundle and representation of the resources in the bundle are maintained over multiple time periods. The graphical module may be further operable to illustrate by displaying the bundle along the second coordinate adjacent to usage representation for the same job but separated along the second coordinate from usage representation of another job.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1A:
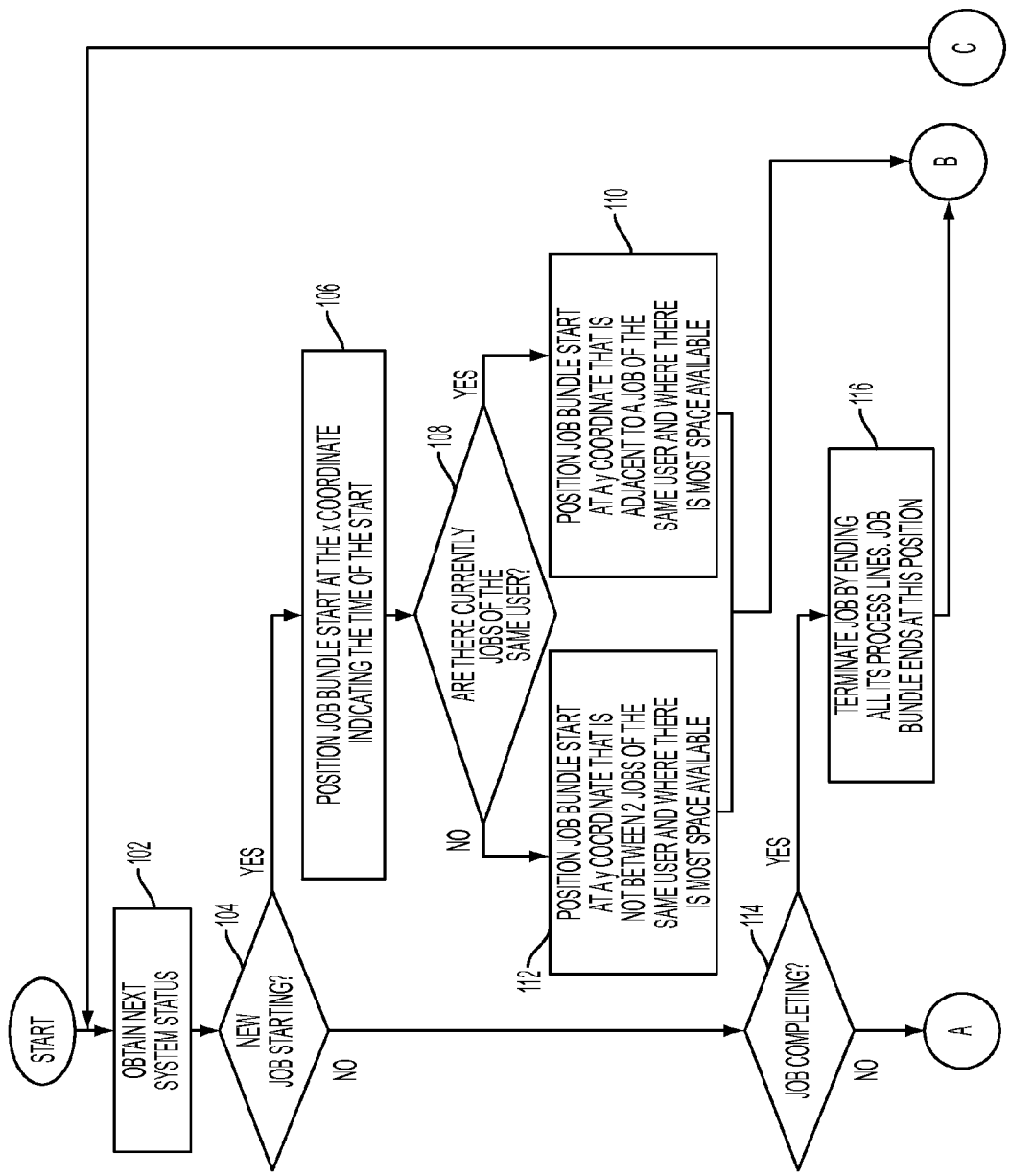
FIGS. 1A and 1B illustrates creating of visualization in one embodiment of the present disclosure with bundles as computer system jobs.

A visualization tool used to show resource usage over time by different jobs is described. A methodology of the present disclosure in one embodiment allows a user to see the resource usage of jobs running on a shared cluster over time, and typically live (with real-time updates) usage of one or more resources. For example, the visualization may change as the system under observation (e.g. Distributed UIMA Cluster Computing (DUCC)) changes. The visualization may get updates every interval of time, e.g., 15 seconds, to reflect the new execution data. The visualization may scroll in a direction (or dimension), e.g., horizontally to the left, e.g., similar to a Windows™ central processing unit (CPU) monitor. A new representation is proposed that shows the evolution of jobs over time efficiently. The methodology of the present disclosure may show the jobs as directional bundles, for example, as horizontal bundles, possibly expanding or contracting within the constraints of the capacity of the system. Specifically, the present disclosure shows jobs as bundles that can expand or contract but maintain continuity in a direction, for example, a horizontal continuity. Rather than forcing the bundles to stick together, the methodology of the present disclosure in one embodiment lets them float within vertical boundaries, generally denoting the capacity of a cluster or a system. For example, the bundles "float" within vertical boundaries that denote the total capacity of the system. The height of the bundle that is "floating" indicates the number of resources the job is using. In one embodiment, the jobs may be color coded to distinguish the job owners. Each resource may be represented as a thick line with a start and end, and the line width may indicate the size of the particular resource. Each resource in the bundle is stacked in the job bundle.

In one embodiment, a methodology of the present disclosure maintains horizontal continuity and works for live, streaming data. The visualization or layout generated according to a methodology of the present disclosure in one embodiment is updated not only for new incoming events, but also retroactively for past events, thus achieving smooth horizontal bundles as much as possible.

Visualization in one embodiment of the present disclosure may comprise a graph that has a horizontal axis that denotes time, presented from right ("now" in case of a real-time feed) to left (the past). A vertical thin slice at a given x-coordinate (i.e., a given time) reflects the set of job bundles and their state at this time.

New data may appear on the right border (at time "now") in the following ways: For a new bundle, a position (y-coordinate) may be identified that has the most vertical space (for expansion). In one embodiment, the position may be found with an additional constraint that specifies that a new job bundle has to be adjacent to a job bundle of the same user, if present, and may not come in between two job bundles of another user. In one embodiment of the present disclosure, a job bundle comprises of its resources. For example, consider the capacity of a cluster expressed in total number of Gigabytes of memory in all the machines, e.g., 2000 GB. Assume a job has 20 resources allocated. Also consider that each resource is typically an equally sized machine or VM, e.g., 45 GB. In this example, the job may be depicted as a job bundle, with height 20×45G=900 GB. Inside the job bundle, the 20 resources may be depicted as 20 (horizontally flowing) lines, each with a thickness of 45 GB. If this job were the only job running in the cluster, more than half of the space would be left empty (2000 GB minus 900 GB is not used), which for example, may be shown as black space above and/or below the job bundle.

In one embodiment of the present disclosure, the height of each job bundle is updated on the "now" time slice to reflect the current number of resources (processes) it uses. If a job bundle expands (with more resources, e.g. "processes"), new strips are added to the top or at the bottom of the existing strips of this job bundle, depending on where there is most space for expansion. This improves the horizontal continuity of the strips within the job bundle.

A layout algorithm may be run to determine the optimal positions (e.g., y coordinates) of bundles at each time slice, for example, to eliminate overlaps of job bundles, and to increase horizontal continuity. The layout algorithm is run not only on the most recent ("now") timeslice on the right, but also on the timeslices to the left of it, with decreasing impact, in one embodiment of the present disclosure.

In one embodiment of the present disclosure, this layout algorithm is iterative, for example, with a major and minor loop. At the major loop, the methodology of the present disclosure in one embodiment may iterate from the rightmost time slice to N time slices left (representing older times). Adjustments in the vertical positions of the bundles are made with decreasing impact, so that the change at the N-th time slice (counting from right to left) is nearly zero. For example, at the right most position ('now'), the placement algorithm may be run with the most impact, meaning that the methodology of the present disclosure may make adjustments in the vertical position of the respective job bundles at this position to have the best possible layout (i.e., no overlap, and horizontal continuity). For example, a new job bundle appearing at 'now', may push up or down existing job bundles. However, as the methodology of the present disclosure iterates over the slices going towards the left, the methodology of the present disclosure in one embodiment may limit the amount that a job bundle can move up or down, to avoid jitter. The bundles may move up or down on the right side, but the vertical adjustment is softened as the methodology of the present disclosure iterates to the left.

In the minor loop, the methodology of the present disclosure in one embodiment may iterate inside each time slice, and adjust the vertical positions of each job bundle based on a spring force model. If there is an overlap between two job bundles, their positions are updated so the overlap decreases. For example, consider two job bundles, one for job A (at the top) and one for job B (at the bottom). If the lower border of job A would at a given time be lower than the upper border of job B, the jobs would overlap. These are imaginary forces, similar to spring model graph layout techniques, will move a bundle up or down. In the case that job A overlaps with job B, the methodology of the present disclosure in one embodiment introduces a force that pulls up job A, away from B, and pulls down job B, away from A. The force may be proportional to their overlap. If the overlap becomes 0, this force disappears. For a job bundle that is not in the rightmost 'now' time slice, its position is adjusted slightly towards the position of this job bundle in the right-neighboring time slice. The force introduced by the right-neighboring job segment works in a similar way. If job bundle A is positioned at height y1 at time coordinate t1 and is positioned at height y2 at time coordinate t2, a force proportional to (y2-y1) may be applied to the job bundle A so it moves closer to y2 at time coordinate t1. The result is that the bundle is straightened out towards the left. The forces (and resulting position updates) in minimizing overlaps in the former are much stronger than the forces in the latter in horizontal continuity. This ensures that no bundles are overlapping. In one embodiment of the present disclosure, the highest priority is that job bundles do not overlap; lower priority is to have a horizontally flowing layout. In the case that the cluster resources are 100% utilized, and no empty space is available between any job bundles, the forces in minimizing overlaps would always remain much stronger than the ones of the horizontal continuity. If the cluster is 100% utilized, there are no empty spaces left that could be used to get a more horizontal flow; all the job bundles are packed next to each other.

Figure 5A:
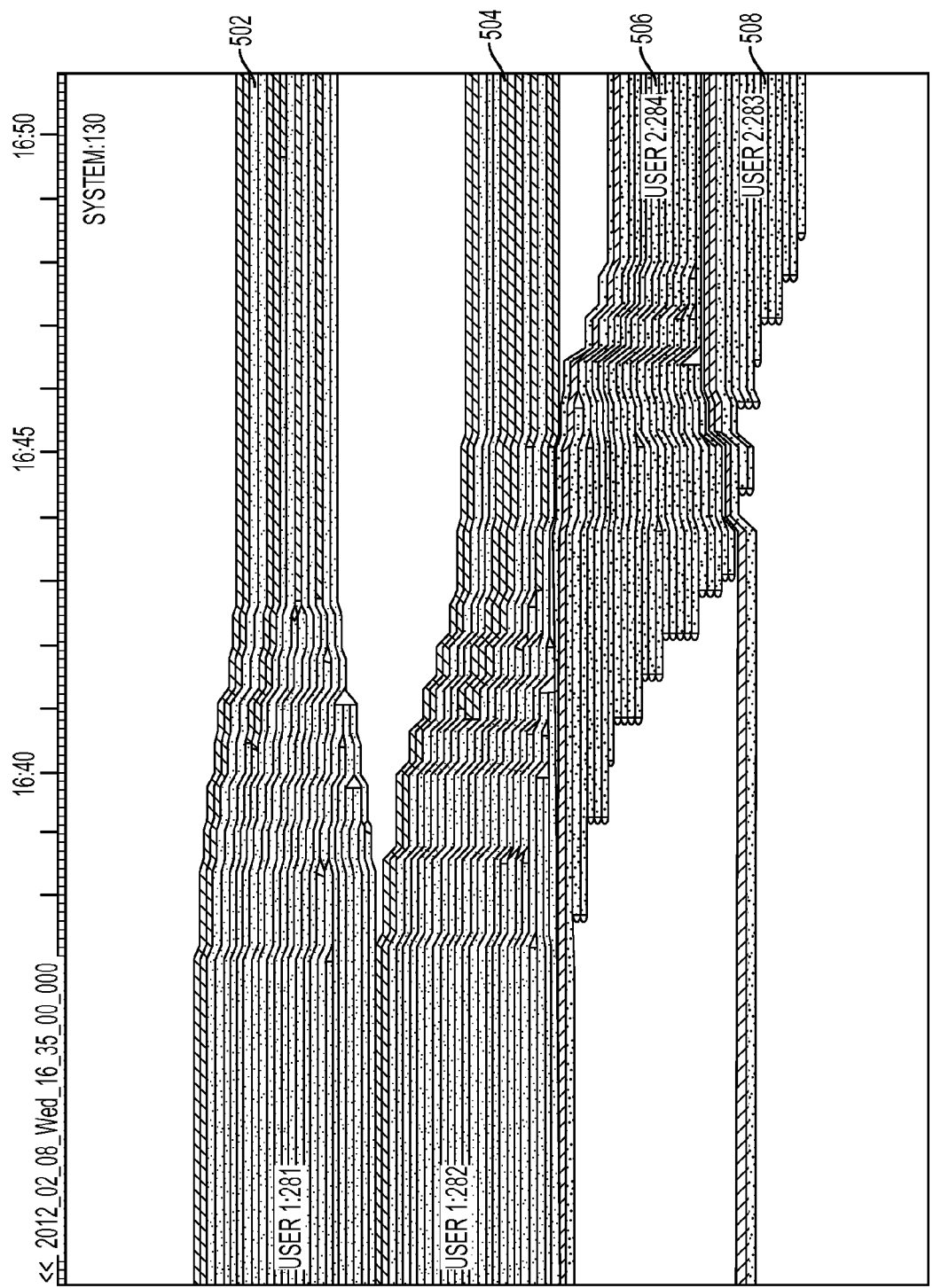
FIGS. 5A-5B illustrate visualization of job bundles in one embodiment of the present disclosure.

A tool that embodies a methodology of the present disclosure is also referred to DUCCsight™. FIG. 5A shows job bundles displayed on a screen or display area of a display device according to a visualization methodology of the present disclosure in one embodiment. The visualization is animated over time; for example, as the jobs are created and completed, the bundles move in a direction, e.g., from right to left horizontally on the display. A bundle (e.g., 502) includes a number of resources represented as lines of thickness inside the bundle. Jobs (e.g., 502 and 504) having the same or similar attributes or types (e.g., same owner or user) may be displayed close together and/or with similar visual cues, e.g., the same color. FIG. 5A also shows the bundles 506 and 508 as belonging to the same owner (same attribute or type).

Figure 5B:
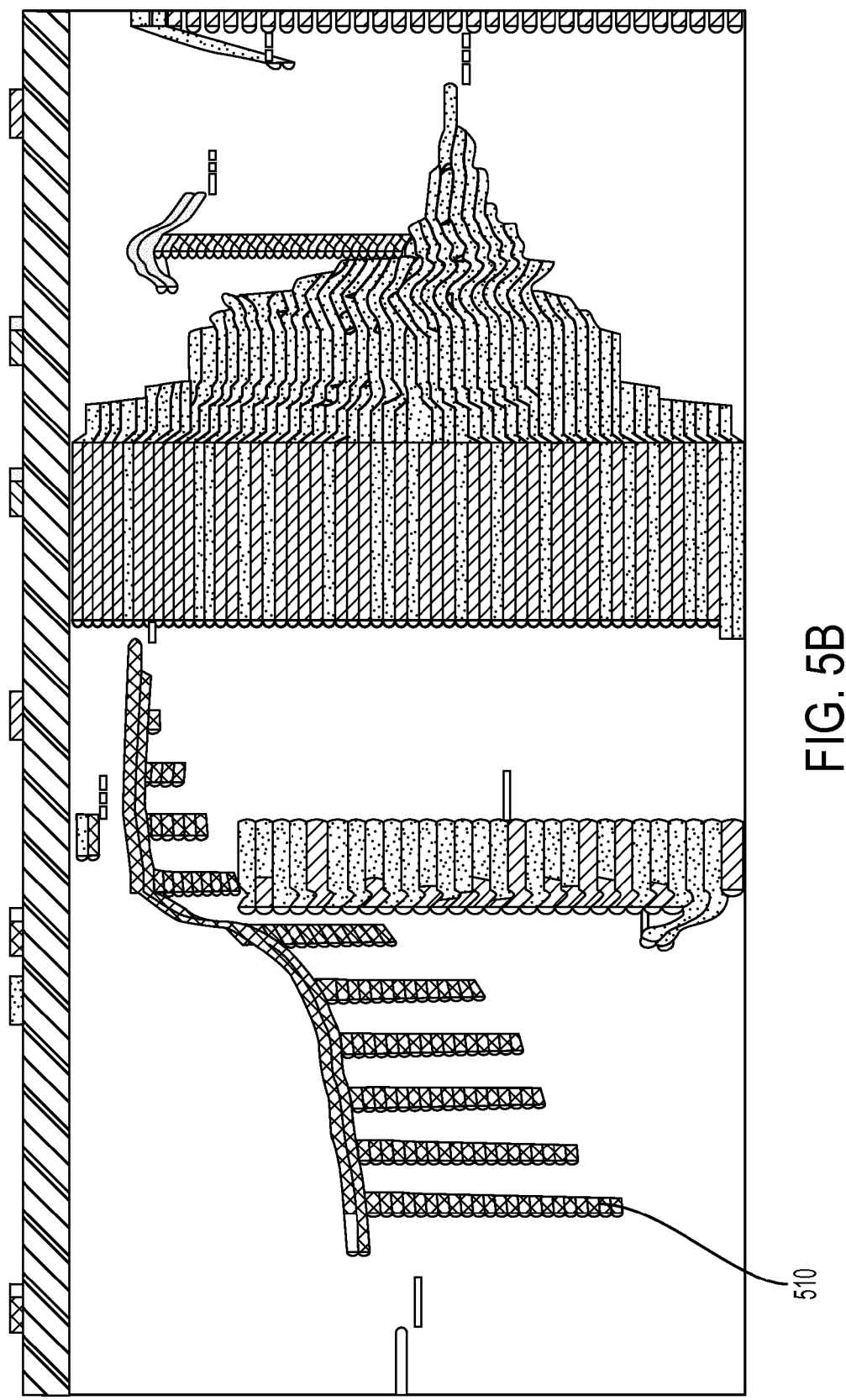

As an example, DUCCsight may be utilized in the Distributed UIMA Cluster Computing scheduler. FIG. 5B shows an example of a behavior that would have been difficult to spot without the DUCCsight visualization. The green "seaweed"-resembling job 510 indicated instability in the scheduling behavior. After correcting the problem in the scheduler, the new behavior of the same green job looked much more condense, and faster.

There is also a social aspect to using this visualization. Greedy users, requesting a lot of resources from the system, and thus slowing down other users' jobs, are exposed easily. In one embodiment, a hyperbolic view (mural) may be utilized, which shows the far past in more condensed manner than the recent past. Similarly, a prediction of the future may be made, with information from the scheduler, about when a job will finish.

In one aspect, a method for displaying multiple entities (e.g., computer system resource usage, computer processing jobs) which have periods where they exist, may comprise understanding a maximal amount of space in one direction (e.g., vertical) that can be used to display a number of such entities, having a point on another direction (e.g., horizontal) depicting time, in which an entity first exists and possibly another point where it ends; having a plurality of types or attributes relationship between the entities describing different desiderata for how close certain types of entities should be in the above direction. One type or attribute of relationship could be if two bundles of resources are owned by the same user, in which case the methodology of the present disclosure may layout these two bundles close to each other. A layout algorithm may take into account the maximal space the entities that have started at a point but not ended and the relationships between the entities.

In another aspect, a method to show the resource usage over time by different jobs may draw each job as a bundle starting at a given time (e.g., corresponding to an x-coordinate) and ending at a given time (corresponding to another x-coordinate). The height of the bundle at a given point in time between start and end may indicate the number of resources this job is using. A resource can be, for example, a process with a certain amount of memory (e.g., RAM) running on a machine. A job area may be drawn with a color, representing, e.g., the owner of the job. Each resource, e.g., a process on a machine, of a job may be represented as a line of selected thickness in this job starting at the x-coordinate indicating its start and ending at the x-coordinate indicating when it ends. These resource lines may be stacked on top of each other and fit at each point in time in the above mentioned job bundle.

Each resource line inside the job can indicate different phases in its execution for instance utilizing different visual cues, including, but not limited to, the start that may be indicated with a visual cue (e.g., as a small colored, e.g., yellow, dot); the initialization phase that may be shown with another visual cue, e.g., as a darker shade of the color used for the job; the 'running' phase that may be shown as a lighter shade of the color used for the job; the end that may be indicated when a process ends in a natural way (e.g., because the process finished all the work items assigned to it); the resource line may end as a rounded line; if a resource (process) was pre-empted, its line may end with a hollow rounded line end.

The layout of the jobs (bundles) and the resource lines (e.g., processes) within a job may promote horizontal continuity, for instance, accomplished by one or more of the following ways. A job (bundle) starts at the "start time" x-coordinate. For example, when the job first appears, the start time will be current time, which in one embodiment is on the rightmost edge of the view. The algorithm then picks a y-coordinate along this rightmost edge where there is most space available, i.e. which is not occupied yet by an existing job, and where there is room for expansion. If other jobs of the same user are currently running, the new job is placed adjacent to the group of other jobs or in between this group of other jobs of this user (e.g., wherever most available space is found), so that all jobs of a user are shown together.

If needed, a job may displace other jobs, up or down, to make room. This can happen when a new job arises or when a job expands (i.e., gets more resources). Inside a job bundle, each resource line (e.g., process) keeps the same position compared to its peer resource lines. When a job bundle expands with one or more resource bundles, they are added at the top or at the bottom of the existing stack of resource lines, depending on where there is more available for expansion. In one aspect, expansion of a job at the very top or at the very bottom of a viewing window (area) may be discouraged, as this may decrease the continuity of the existing resource lines. For instance, if a job was located at the very top of the view, an expansion at its very top would push the existing resource lines down. Expanding a top-located job toward its bottom line will keep its existing resource lines flowing at the same height.

In one aspect, the visualization of the present disclosure is produced in real-time, for example, as information is received or streams in. Producing this visualization in real-time may include in one embodiment, updating the view at regular intervals, or for each new event, scrolling the existing view sideways, and adding the new information to one side, e.g., the right side, similar to a central processing unit (CPU) usage or memory usage indicator. The "now" timeline corresponds to that side, e.g., the right side border of the view. To enhance horizontal continuity, layout mechanism may be rerun on the whole view so that, where space is available, resource lines are straightened out from right to left. This way, sharp bends as a result of sudden job expansions of creations are smoothed out.

A resource line may be used to represent a fixed (or slowly changing) number of resources (a resource pool), and bundles may be used to represent different entities that use a variable number of this resource pool.

The visualization of the present disclosure may be applied to a map-reduce application with bundles representing jobs and resource lines representing nodes. The visualization of the present disclosure may be also applied for visualizing usage of virtual computing environment such as in a cloud computing installation where usage of computer systems, resources and/or applications are offered as service. In such visualization, each bundle may represent an application or customer, and each resource line may represent the number of nodes used to support the application or customer.

The visualization of the present disclosure may allow for managing of a limited-resource system, for instance, even with overbooking as part of the strategy. Expense in initialization time and/or shutdown time may be indicated with a visual cue, e.g., colored in the darker shades, for example to denote that too much churn may have negative impact to the system.

The visualization of the present disclosure may be applied also for visualizing network traffic of a network trunk channel with a finite capacity (e.g., bandwidth) that is shared by multiple clients. Each bundle may represent the usage of a particular client, and each resource line may represent a unit of the channel's capacity (e.g., 1 megabits per second (Mbps)). In such representation, a resource line may be widened to represent additional capacity usage (e.g., while a single width resource line represents 1 Mbps, a line with 5 times the width may represent 5 Mbps).

The visualization of the present disclosure may be applied also for visualizing the composition of a managed mutual fund or individual's financial portfolio over time where. In such representation, bundles may represent different investments with different visual cues (e.g., stock A is blue, stock B is yellow), the total height may represent the fund (or portfolio's) size, and resource lines may represent some number of individual shares (or multiples thereof, e.g., 1M shares). In this case, the thickness of a resource line may correspond to the net asset value (NAV) of the stock. For example, colored areas (e.g., black areas) may represent cash holdings. Initialization "shades" may correspond to regulatory rules for holding the stock a minimum amount of time.

The visualization of the present disclosure may be applied also for visualizing workforce assignment. Each "Job bundle" may represent a project, and each resource line may represent an employee (or a number of employees). The width of the lines may be used to represent the given employee's age or skill level or wage level. Churn may show up as unused (e.g., black) areas.

The visualization of the present disclosure may be applied also for visualizing the demographics of a population that changes over time. For example, the total height may represent the total number of individuals (e.g., the number of residents of an area, or institution). The different bundles represent the demographic groups (e.g., "automobile industry employees", "government employees", "retail industry employees"). The resource lines may represent the individuals or particular number of individuals.

Figure 1B:
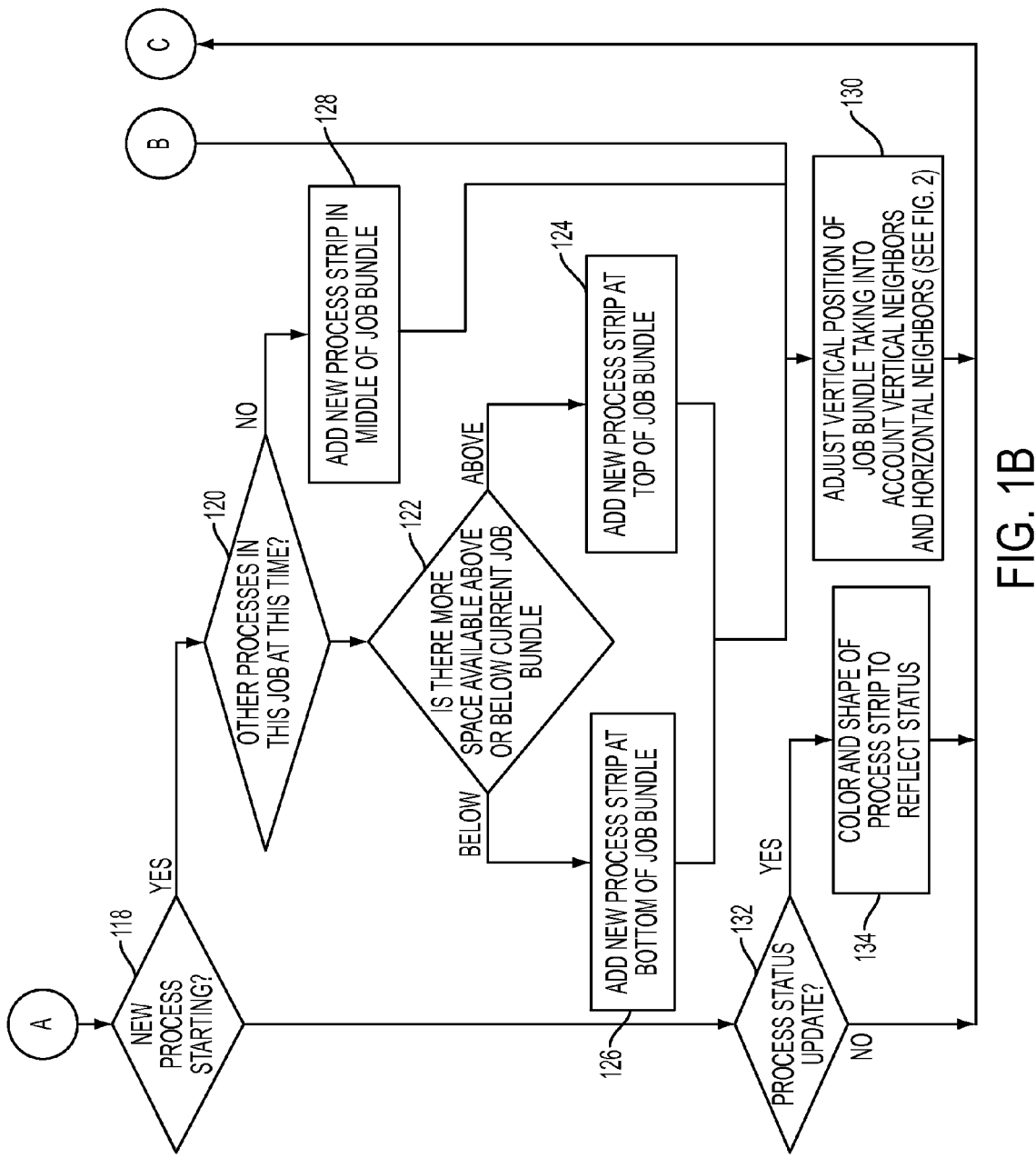

FIGS. 1A and 1B illustrate creating of visualization in one embodiment of the present disclosure with bundles as computer system jobs. At 102, system status is obtained. A system status for example, may include all the jobs that are running at that point in time and for each job, its state (e.g., created, running, completing, and other states) as well as for each job, all its resources and their states (e.g., initializing or running or deleted or others). At 104, it is determined based on the obtained system status, whether a new job is starting. For example, a new job may be detected as starting if this new job is seen (or identified in the system status) for the first time. The system status may also indicate its status as "initializing".

If a new job is starting, at 106, a job bundle start representing the new job's starting time is positioned at the x-coordinate of a graphical visualization to indicate the time of the start. At 108, it is determined whether the user of the new job has other currently running jobs under the same user. If so, at 110, the job bundle start is positioned at a y-coordinate that is adjacent to a job of the same user and where there is most space available. If the user of the new job does not have any other jobs running, at 112, the job bundle start is positioned at a y-coordinate that is not between two jobs of a same user and where there is most space available. The processing proceeds to 130 in FIG. 1B.

If at 104, it is determined that no new job is starting, the processing continues to 114, where it is determined whether a job is completing based on the obtained system status. For instance, the system status may indicate a job that has a status of "completing". It is possible that the job is not reported anymore by the system, in which case, the methodology of the present disclosure may interpret such a sudden disappearance of a job in the system status as a completion for that job. If it is determined that a job is completing, at 116 the job is terminated by ending all its process lines. A job bundle associated with the job ends at this x-coordinate position.

At 114, if it is determined that a job is not completing, the processing continues to 118 shown in FIG. 2B. At 118, it is determined whether a new process is starting based on the obtained system status. For example, a new process would be reported as part of information for its job, with status "initializing". Even if the methodology of the present disclosure misses the new process being in "initialization" state, e.g., because the process may have been already in "running" state when it was first reported, the methodology of the present disclosure in one embodiment may interpret a new appearance of a process not detected or seen before, as the initialization of this process. If it is determined that a process is starting, at 120, it is determined whether there are other processes in this job at the current time. If there are other processes, at 122, it is determined whether there is more space available vertically above or below the current job bundle. At 124, in response to determining that there is more space above, a new process strip is added at top of the job bundle. At 126, in response to determining that there is more space below, a new process strip is added at the bottom of the job bundle.

At 130, the vertical position of the job bundle is adjusted taking into account the vertical neighbors and horizontal neighbors. An embodiment of this procedure is described below with reference to FIG. 2 in more detail. The processing then returns to 102, and repeats the procedure.

Referring back to 118, if it is determined that there are no new processes starting, it is determined at 132 whether there is a process status update. If it is determined that there is a process status update, visual cues may be updated to reflect the status change, e.g., the color and shape of a process strip may be updated to reflect the current status. The processing returns to 102, and repeats the procedure.

Figure 2:
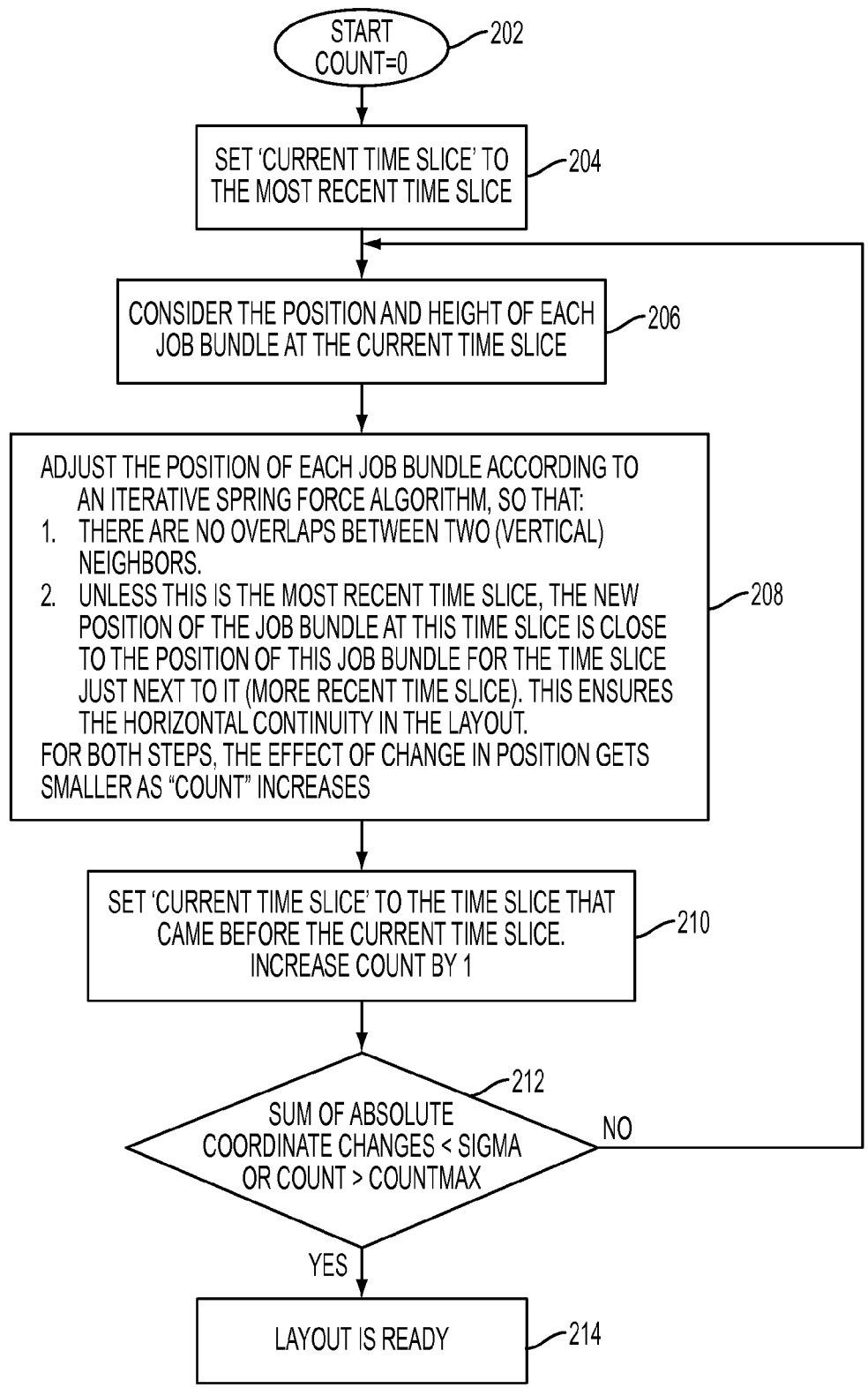
FIG. 2 is a flow diagram illustrating a method of adjusting vertical position of a bundle in one embodiment of the present disclosure.

FIG. 2 is a flow diagram illustrating a method of adjusting vertical position of a bundle in one embodiment of the present disclosure. At 202, 'count' variable is set to zero. At 204, 'current time slice' variable is set to the most recent time slice. In one embodiment of the present disclosure, time slices are equally sized time intervals (e.g., 10 seconds or 2 minutes). The time intervals may be determined by the times at which new data updates are delivered. For example, in one embodiment, new data from the cluster is delivered every 15 seconds to the visualization system, which provides for 15 second time slices.

At 206, the position and height of each job bundle at the current time slice is considered. At 208, the position of each job bundle is adjusted according to an iterative spring force algorithm, so that: there are no overlaps between two (vertical) neighbors; and, unless this is the most recent time slice, the new y-position of the job bundle at this time slice is close to the y-position of this job bundle for the time slice just next to it (more recent time slice). Ideally, the y-position of the job bundles from one time slice to the next would not change. This ensures the horizontal continuity in the layout. In practice, it is not always possible to maintain the same y-coordinate, since it is desired to avoid overlaps, e.g., as a result of job bundle expansions or new job bundles appearing. For both steps, the effect of change in position gets smaller as 'count' increases. In other words, the more the job bundle is moved to the left, the less the change in the position of previously laid out job bundles.

At 210, 'current time slice' is set to the time slice that came before the current time slice, and 'count' is increased by 1. At 212, it is determined whether the iteration should end. The iteration, e.g., ends if the sum of all the absolute changes in the y-coordinates is smaller than a predefined constant SIGMA. This means the iteration can stop when the coordinates have converged to a stable position. The iteration may also end if a total number of iterations has exceeded a defined number, e.g., a constant CountMax, e.g., 10000. This second condition is a safety stop to prevent the layout algorithm taking too long to converge. In this case, there may be a suboptimal layout, e.g., some miniscule overlaps may remain. If one of the two conditions are satisfied, the layout is ready at 214. Otherwise, the method continues to 206 and repeats the adjusting.

Figure 4A:
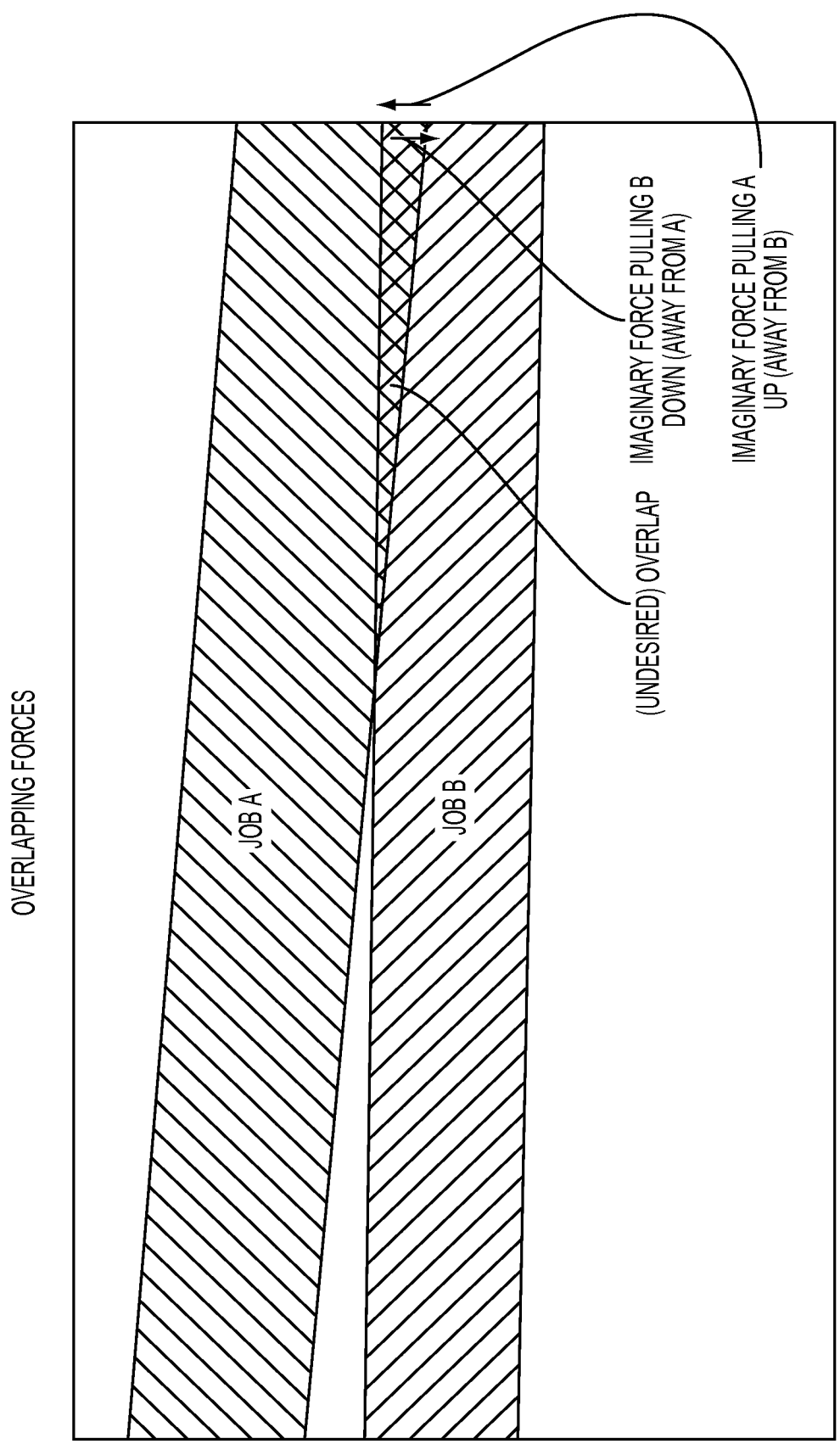
FIGS. 4A-4D illustrate forces being applied for adjusting a bundle in a visualization of the present disclosure in one embodiment displayed on a display area.
Figure 4B:
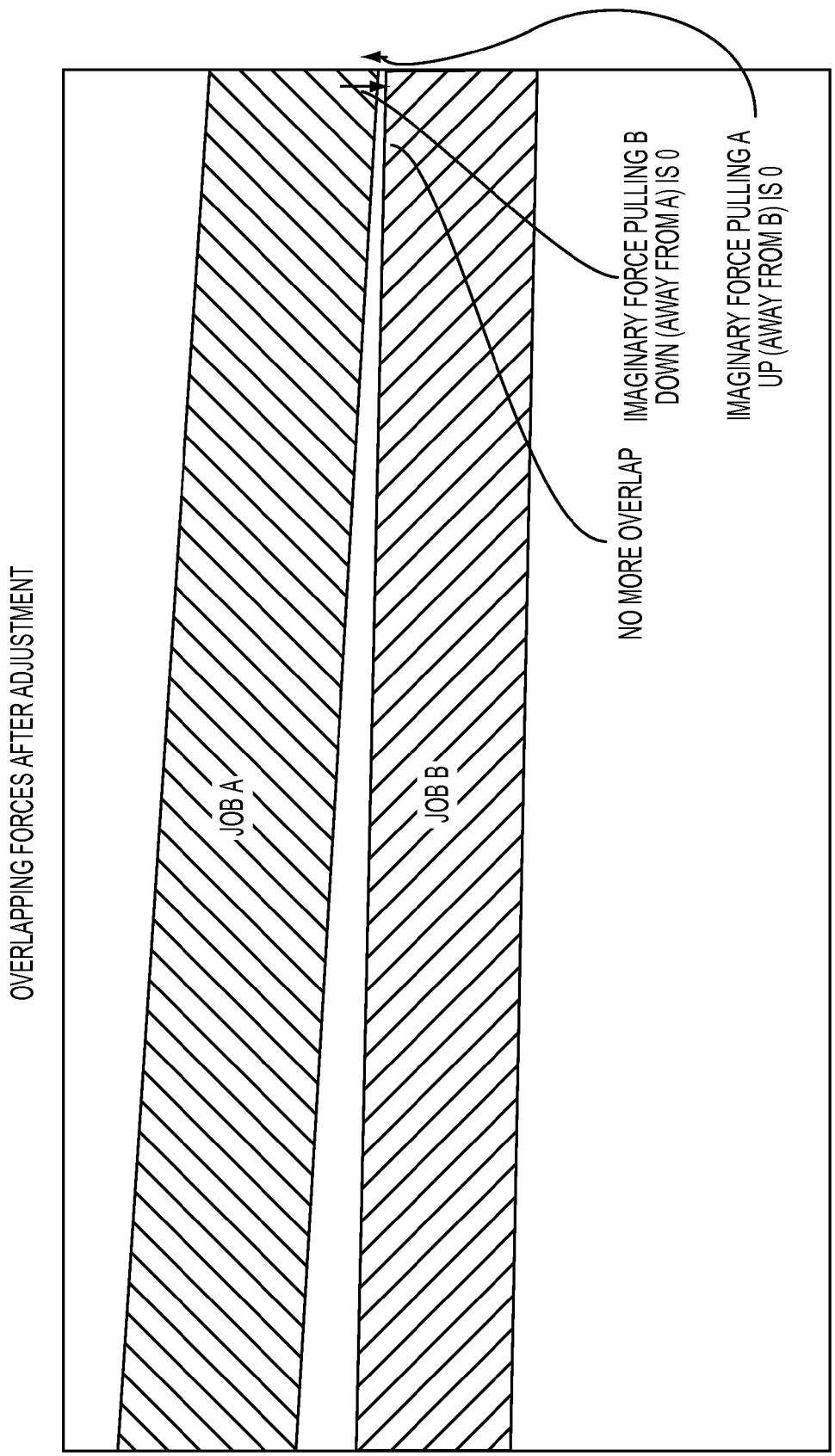

FIGS. 4A-4D illustrate forces being applied for adjusting a bundle in a visualization of the present disclosure in one embodiment displayed on a display area. Each job may be represented by a job bundle. A job bundle can have varying y-positions (or another axis positions) over time, to avoid overlaps and to accommodate expansions and shrinking of its resources. FIG. 4A shows an example of two job bundles (Job A and Job B) whose bundles overlap in the visualization. A methodology of the present disclosure in one embodiment may apply a force to pull down the bundle representing Job B away from the bundle representing Job A. Similarly, a force may be applied to pull up the bundle representing Job A away from the bundle representing Job B. FIG. 4B shows the visualization after one or more such forces have been applied.

Figure 4C:
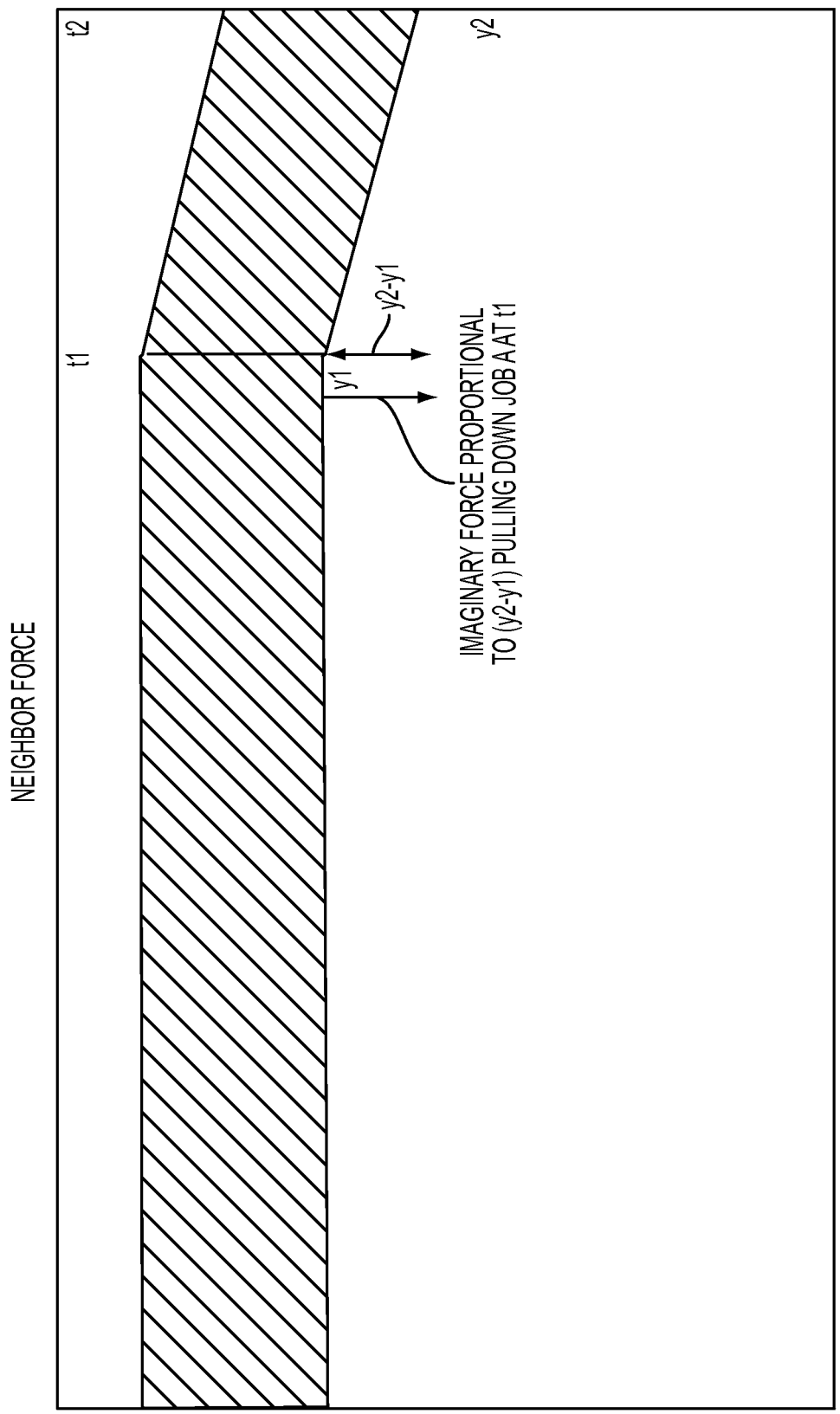
Figure 4D:
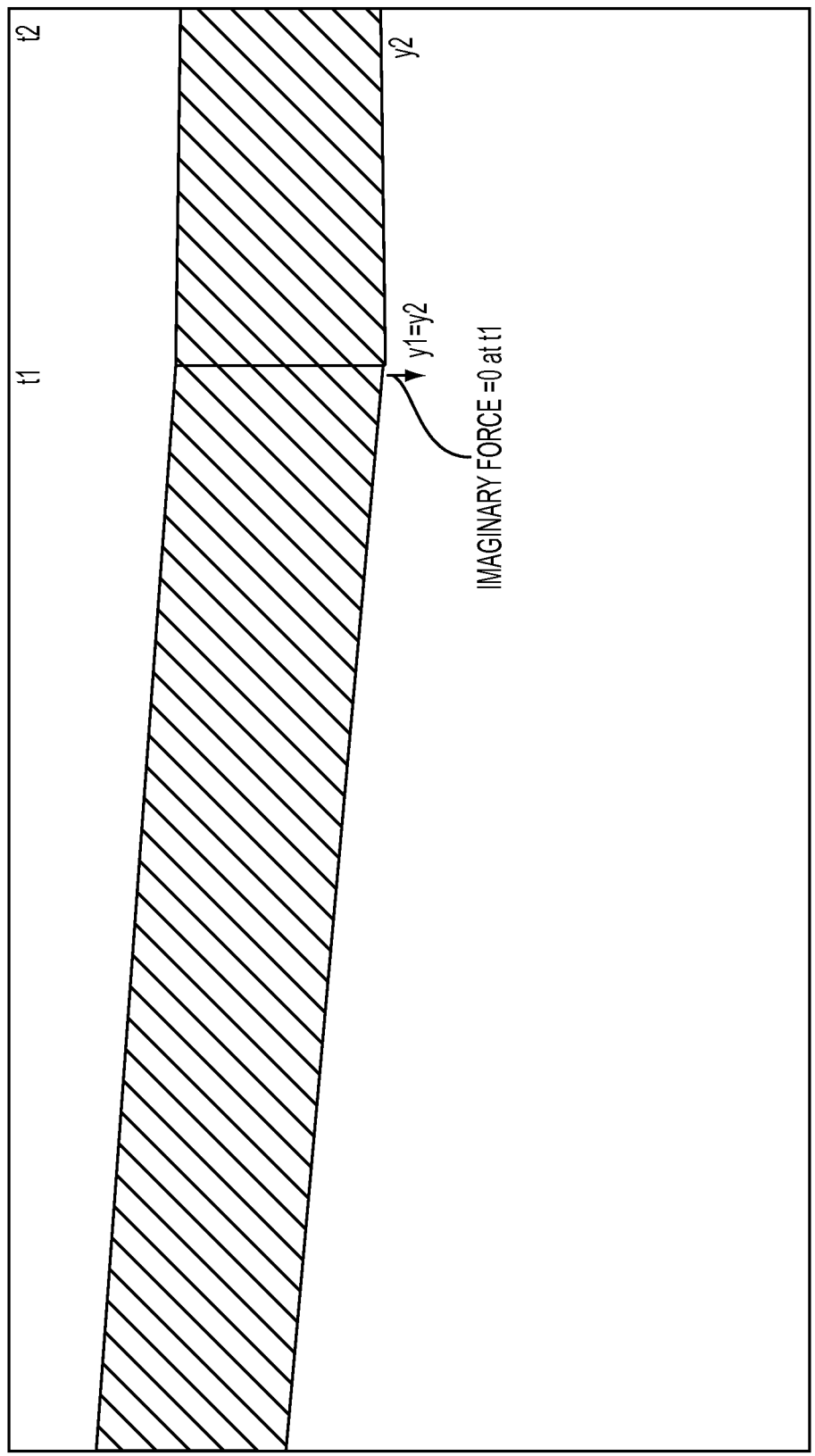

FIG. 4C shows an example of an adjustment to the visualization due to a neighbor force. At a time coordinate, $t1$, a job bundle may be pulled by a force proportional to a determined displacement (e.g., $y2-y1$). FIG. 4D shows the visualization of the bundle adjusted after the neighbor force. Neighbor force is applied, e.g., in response to determining that another bundle should be placed adjacent to the bundle being displaced.

A methodology of the present disclosure in one embodiment lays out different jobs in way to preserve horizontal continuity, so that the varying thickness of the representation over time can easily be observed. In one aspect, the y-coordinate of a job in the present disclosure may be used for the purpose of obtaining an optimal layout, not to indicate a geographic location. In another aspect, resource usage is shown with the different entities (jobs) having varying locations, depending on the resource usage of all jobs that are present at a given time.

Yet in another aspect, a methodology of the present disclosure inserts a new job at a y-coordinate where there is most room for expansion and, if applicable, next to a job of the same user. The methodology of the present disclosure may enhance horizontal continuity by updating all the y-coordinates, from right to left, for each job. The methodology of the present disclosure may also dynamically update the visualization to optimize the layout as a result of new data is received. Furthermore, the job bundles from the previous time slice may be also be adjusted, e.g., latently. Empty space may be used to separate different jobs, e.g., there may be an empty space between the job bundles in the visualization. The methodology of the present disclosure in one embodiment also allows for single simultaneous overview over time of the activity.

The visualization of the present disclosure allows for a display of computing system usage by job bundles. A space between bundles may present individual bundle usage in a way to be more easily viewed. The smoothness of bundle display may be maintained by backward adjustment of display. While bundles may expand or contract, they maintain horizontal continuity. A bundle for one job set represents all resources used by that job set.

The terminology "job" as used in the present disclosure need not be limited to computer related jobs. Rather, a "job" may refer to any task, endeavor or the like that may evolve over time, may have attributes, and for example, may share resources with others. Examples of a "job" may include but are not limited to, a computer processing job or the like, a financial portfolio or the like, demographics of population or the like, aspects related to industry, and others.

In the above description, examples were described with respect to maintaining directional continuity as horizontal continuity; however, the present disclosure does not limit the methodology to a particular direction. Rather, the continuity, for example, may be implemented in another direction. For instance, the continuity of a bundle may be maintained vertically (or in any different degree of direction), while the different bundles may be stacked along horizontally (or in another degree of direction).

Figure 3:
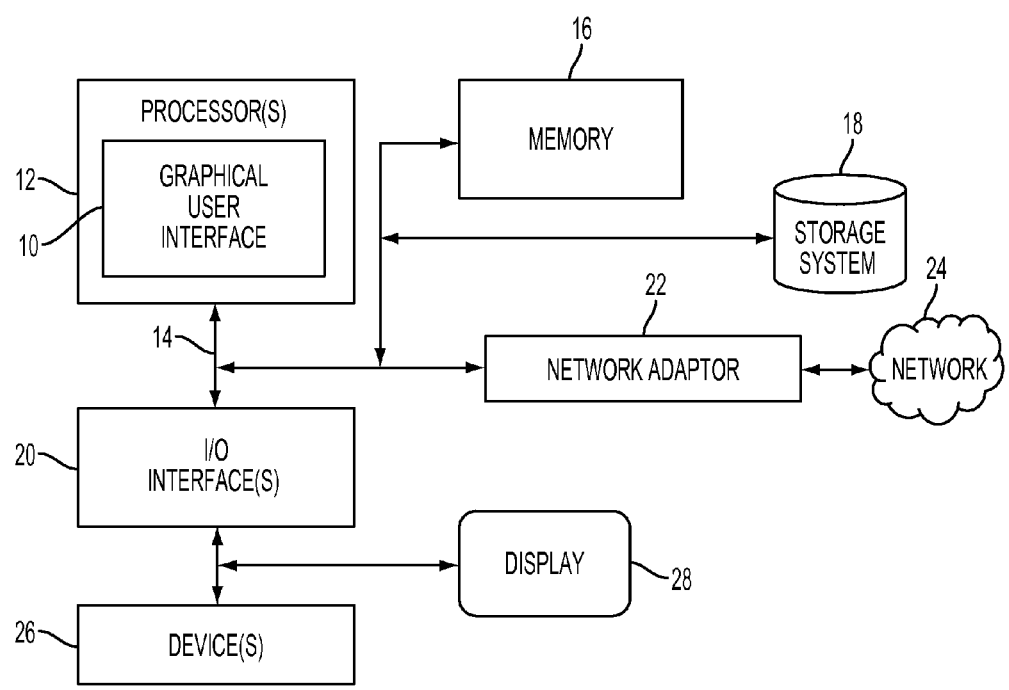
FIG. 3 illustrates a schematic of an example computer or processing system that may implement the visualization system in one embodiment of the present disclosure.

FIG. 3 illustrates a schematic of an example computer or processing system that may implement the system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a visualization module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of visualizing resource usage over time, comprising:
    obtaining a status of resource usage for a current time period;
    for a new job starting during the current time period as identified in the obtained status,
    positioning, by at least one processor, a job bundle to start at a first coordinate of a display to indicate a time of the start of the new job;
    determining based on the obtained status whether a user of the new job has one more other jobs running in the current time period;
    in response to determining that the user has one or more other jobs running in the current time period, positioning the job bundle to start at a second coordinate of the display that is adjacent to the one or more other jobs and where there is most space available;
    in response to determining that the user does not have one or more other jobs running in the current time period, positioning the job bundle to start at the second coordinate that is not between two jobs belonging to another user and where there is most space available;
    adjusting, by the at least one processor, a position of the job bundle along the second coordinate taking into account one or more neighbors along the second coordinate and one or more neighbors along the first coordinate of the job bundle; and
    repeating the above steps, by the at least one processor, in a next time period with the next time period as the current time period.

2. The method of claim 1, wherein the adjusting of the position along the second coordinate comprises:
    setting current time slice to the current time period;
    adjusting a position of each job bundle visualized in the display according to an iterative spring force algorithm so that no overlaps occur between two job bundles that are neighbors along the second coordinate, and the position of said each job bundle at the current time slice is directly adjacent to a job bundle of a next time slice;
    setting the current time slice to a time period that is immediately before the current time period and incrementing said count by one; and
    repeating said adjusting and setting the current time slice to a time period that is immediately before the current time period until a predetermined criterion is met.

3. The method of claim 1, further comprising:
    for an ending job that is identified in the obtained status as completing in the current time period,
    terminating the ending job by ending all associated process lines displayed as a job bundle associated with the ending job; and
    performing said adjusting.

4. The method of claim 1, further comprising:
    for a new process identified as starting in the obtained status,
    determining whether there are one or more other processes in a job running the new process;
    in response to determining that there are no other processes in the job running the new process, adding a new process strip in the display in a middle of a job bundle representing the job, and performing said adjusting;
    in response to determining that one or more of the other processes exist, determining a side of the job bundle along the second coordinate that has more space available, and adding the new process strip on the side that is determined to have more space available, and performing said adjusting.

5. The method of claim 1, further comprising:
    for status update of a process detected in the obtained status,
    updating one or more visual cues of a process strip associated with the process to reflect the status update.

6. The method of claim 1, wherein the status of resource usage is received as streaming data covering multiple time periods.

7. A method to show resource usage over time by different jobs, comprising:
    illustrating each of the different jobs on a computer display area comprising a horizontal coordinate representing units of time and a vertical coordinate, said each job drawn as a bundle starting at a first given time along in said horizontal coordinate of the display area and ending at a second given time, a height of the bundle along the vertical coordinate at a given point in time between start time and end time of the bundle indicating a number of resources said each job is using,
    the illustrating further comprising displaying the bundle horizontally adjacent to a previously displayed bundle of the same job in previous start and end time period wherein continuity of the bundle and representation of the resources in the bundle are maintained over multiple time periods, and displaying the bundle vertically adjacent to usage representation for the same job but separated vertically from usage representation of another job.

8. The method of claim 7, wherein one or more of the resources include a process with an amount of RAM running on a machine.

9. The method of claim 7, wherein the illustrating further comprises allocating different colors to represent different owners associated with said different jobs.

10. The method of claim 7, wherein the illustrating further comprises representing each of the resources as a line of predetermined thickness in said bundle starting at the first given time along said horizontal coordinate and ending at the second given time, wherein each of said line is stacked on top of another in the bundle, the thickness representing an amount of the resources.

11. The method of claim 10, wherein said each resource line inside the bundle indicates different phases in its execution, wherein the different phases are indicated with different visual cues.

12. The method of claim 7, wherein a layout of said computer display area visualizing the different jobs maintain continuity of the bundle and the representation of resources in the bundle over multiple time periods by at least one or more of:
- placing the bundle at the vertical coordinate where there is most space available;
- displacing one or more other job bundles along the vertical coordinate to make room for the bundle;
- keeping a same position of the representation of resources relatively to one another in the bundle;
- expanding the bundle with one or more additional resources by adding to an existing stack of resource lines representing the resources.

13. The method of claim 7, wherein the illustrating further comprises updating the display in real-time at a defined interval as information streams in.

14. The method of claim 13, wherein the updating the display further comprises updating the bundle displayed backwards over multiple time periods.

15. The method of claim 7, wherein one or more lines in the bundle represent a fixed number of said resources and the bundle represent an entity that uses a variable number of the resources.

16. The method of claim 7, wherein the bundle represents a job in a map-reduce application and the resources represent nodes.

17. The method of claim 7, wherein the bundle represents an application or a customer or both in a virtualized computing environment and the resources represent a number of nodes used to support the application or the customer or both.

18. The method of claim 7, wherein the bundle represents a usage of a client utilizing a network trunk channel that is shared by multiple clients and the resources represent a unit of the channel's capacity.

19. The method of claim 7, wherein the bundle represents a financial portfolio and the resources represent individual shares.

20. The method of claim 7, wherein the bundle represents a project and the resources represent workers in the project.

21. The method of claim 7, wherein the bundle represents a demographic group and the resources represent members in the demographic group.

22. The method of claim 1, wherein the first coordinate is an x-coordinate and the second coordinate is a y-coordinate.

23. A method to show resource usage over time by different jobs, comprising:
- illustrating each of the different jobs on a computer display area comprising a first coordinate representing units of time and a second coordinate, said each job drawn as a bundle starting at a first given time along in said first coordinate of the display area and ending at a second given time, a height of the bundle along the second coordinate at a given point in time between start time and end time of the bundle indicating a number of resources said each job is using,
- the illustrating further comprising displaying the bundle along the first coordinate adjacent to a previously displayed bundle of the same job in previous start and end time period wherein continuity of the bundle and representation of the resources in the bundle are maintained over multiple time periods, and displaying the bundle along the second coordinate adjacent to usage representation for the same job but separated along the second coordinate from usage representation of another job.

24. The method of claim 23, wherein the first coordinate is a horizontal coordinate and the second coordinate is a vertical coordinate.

* * * * *